(12) United States Patent  (10) Patent No.: US 6,230,579 B1
Reasoner et al.                (45) Date of Patent:    May 15, 2001

(54) MULTI-MODE SHIFTER ASSEMBLY JOINT

(75) Inventors: Michael V. Reasoner, Grand Blanc; Klemens J. Meyer, Northville, both of MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/442,443

(22) Filed: Nov. 17, 1999

(51) Int. Cl.[7] ................................................ F16H 59/02
(52) U.S. Cl. ...................................... 74/473.18; 74/473.34
(58) Field of Search .............................. 74/473.18, 473.34

(56) References Cited

U.S. PATENT DOCUMENTS

| 927,698 | 7/1909 | Warner . |
|---|---|---|
| 2,772,652 | 12/1956 | Shane et al. . |
| 2,775,134 | 12/1956 | Swenson . |
| 4,515,033 | 5/1985 | Carlo . |
| 4,732,232 | 3/1988 | Miyagi et al. . |
| 4,905,530 | 3/1990 | Stehle et al. . |
| 4,987,792 | 1/1991 | Mueller et al. . |
| 5,044,220 | 9/1991 | Raff et al. . |
| 5,062,314 | 11/1991 | Maier et al. . |
| 5,150,633 | 9/1992 | Hillgartner . |
| 5,197,344 | 3/1993 | Maier et al. . |
| 5,509,322 | 4/1996 | Anderson et al. . |
| 5,520,066 | 5/1996 | Tueri . |
| 5,555,961 | 9/1996 | Olmr . |
| 5,622,079 | 4/1997 | Woeste et al. . |
| 5,689,996 | 11/1997 | Ersoy . |
| 5,768,944 | 6/1998 | Inuzuka et al. . |
| 5,791,197 | 8/1998 | Rempinski et al. . |
| 5,799,539 | 9/1998 | Haase . |
| 5,899,115 | * 5/1999 | Kataumi et al. .................. 74/473.18 |

* cited by examiner

Primary Examiner—Allan D. Herrmann
(74) Attorney, Agent, or Firm—Howard & Howard

(57) ABSTRACT

A shifter assembly (10) for automatic transmissions is disclosed having a base (12) and a detent member (14) supported by the base (12). The detent member (14) defines an automatic (18) and manual (20) shift path and a plurality of gear positions (22, 24, 26, 28, 30, 32, 34) within the shift paths (18, 20). A transmission control arm (60) is pivotally connected to the base (12) for movement about an axis (A) and is adapted for connection to a linkage for operating an automatic transmission. The shifter assembly (10) also has a shift lever (42) movable through the gear positions (22, 24, 26, 28, 30, 32, 34). The assembly (10) is characterized by including a pivotal connection (80) interconnecting the control arm (60) and the shift lever (42) for supporting the shift lever (42) on the control arm (60) and pivoting the shift lever (42) relative to the control arm (60) for changing between the shift paths (18, 20).

8 Claims, 5 Drawing Sheets

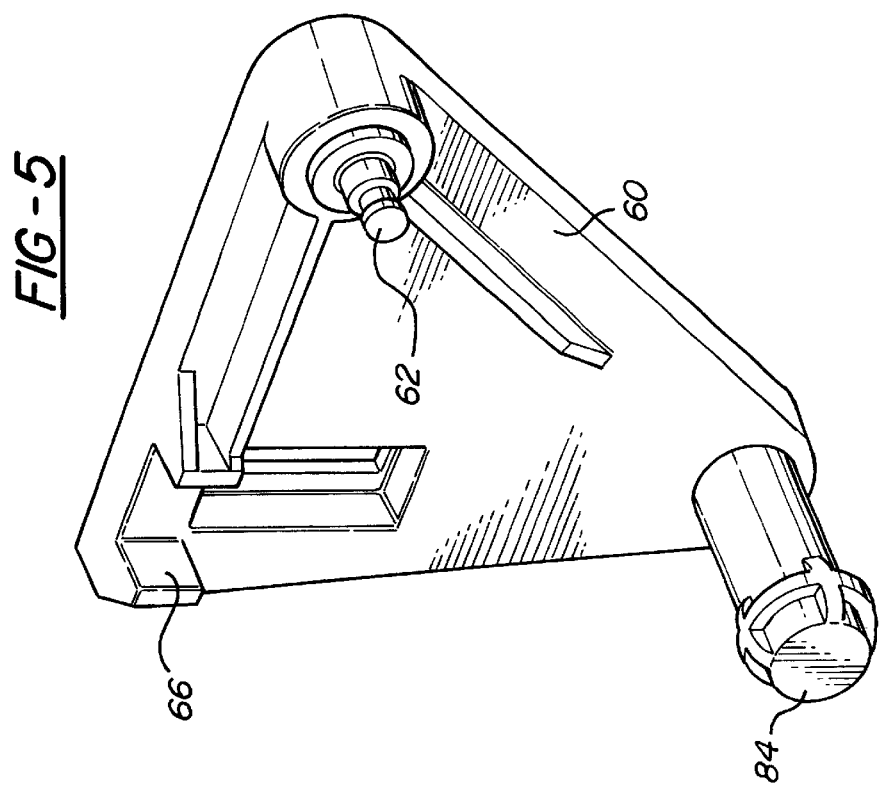
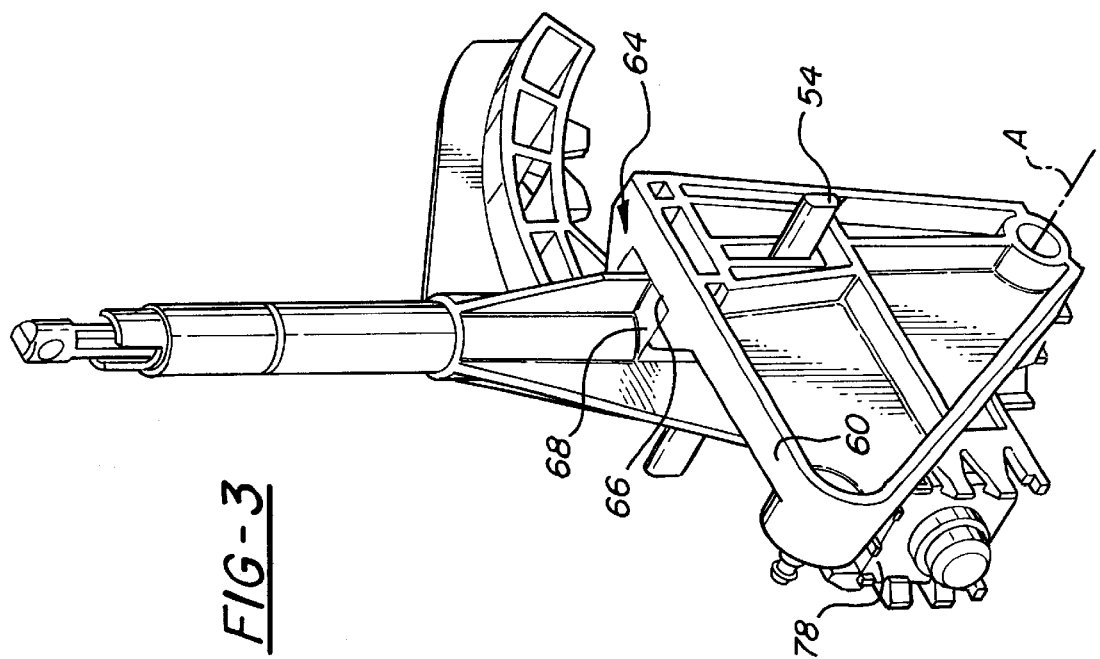

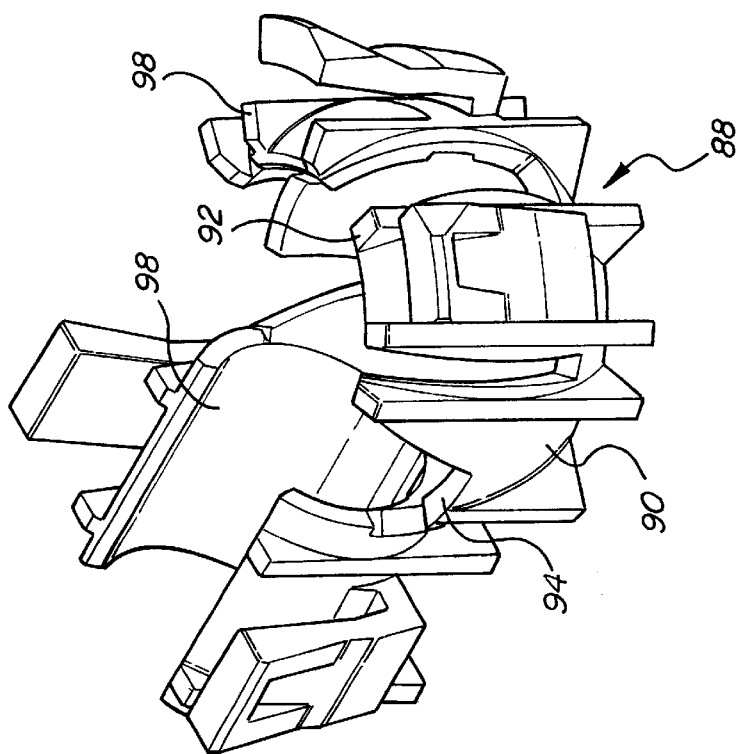
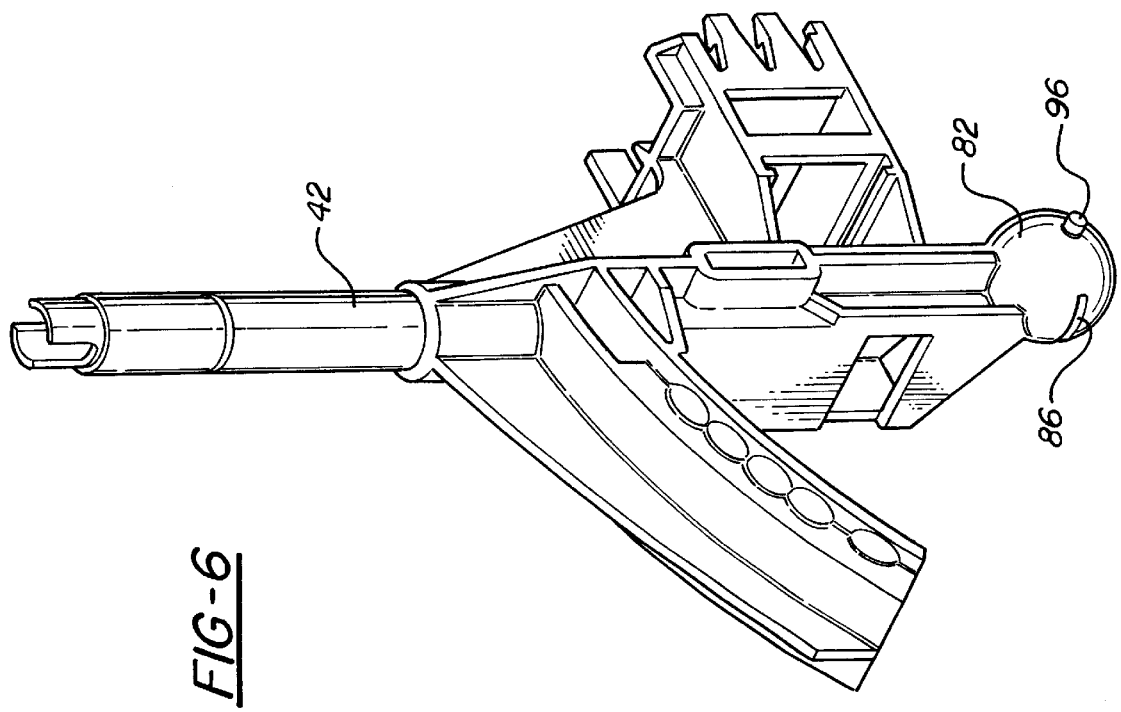

MULTI-MODE SHIFTER ASSEMBLY JOINT

BACKGROUND OF THE INVENTION

1. Field of the Invention

The present invention relates to a shifter assembly for automatic transmissions, and more specifically, to a shifter assembly having an automatic and a manual shift path.

2. Description of the Prior Art

Multi-mode shifter assemblies are used with automatic transmissions and provide a normal automatic mode and a manual mode in which the automatic transmission may be shifted like a manual transmission. To switch from automatic to manual mode, a shift lever is moved from an automatic shift path to a parallel manual shift path where the driver may then shift through the transmission gears manually. Such assemblies typically include a detent member supported by a base for deterring parallel automatic and manual shift paths for a shift lever which, in turn, rotates a control warn which is pivotally supported by the base. One such assembly is disclosed in U.S. Pat. No. 5,791,197 to Rempinski et al. issued Aug. 11, 1998. The transmission control arm in the Rempinski patent is pivotally connected to the base for movement about an axis for connection to a linkage for operating the automatic transmission and the shift lever is supported on the base independently of the control arm. More specifically, a ball and socket joint supports the shift lever on the base for pivotal movement relative to the control aim for changing between shift paths. There is always a need to simplify the assembly by reducing the number of components and to develop a more efficient interaction among the components.

SUMMARY OF THE INVENTION AND ADVANTAGES

The present invention provides a shifter assembly for automatic transmissions having a base and a detent member supported by the base. The detent member defines an automatic and manual shift path and a plurality of gear positions within the shift paths. A transmission control arm is pivotally connected to the base for movement about an axis and is adapted for connection to a linkage for operating an automatic transmission. The shifter assembly also has a shift lever movable through the gear positions. The assembly is characterized by including a pivotal connection interconnecting the control arm and the shift lever for supporting the shift lever on the control arm and pivoting the shift lever relative to the control arm for changing between the shift paths.

Accordingly, the present invention provides a shifter assembly wherein the interaction among the components is improved by mounting the shift lever on the control arm instead of on the base thereby reducing the number of components. The interaction between the control arm and the shift lever is more tightly controlled as a result of the shift lever being pivotally supported directly on the control arm.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of one side of a sub-assembly having a control arm and shift lever;

FIG. 5 is a perspective view of the control arm;

FIG. 6 is a perspective view of the shift lever; and

FIG. 7 is a perspective view of a retainer.

DETAILED DESCRIPTION OF THE PREFERRED EMBODIMENT

Figure 1:
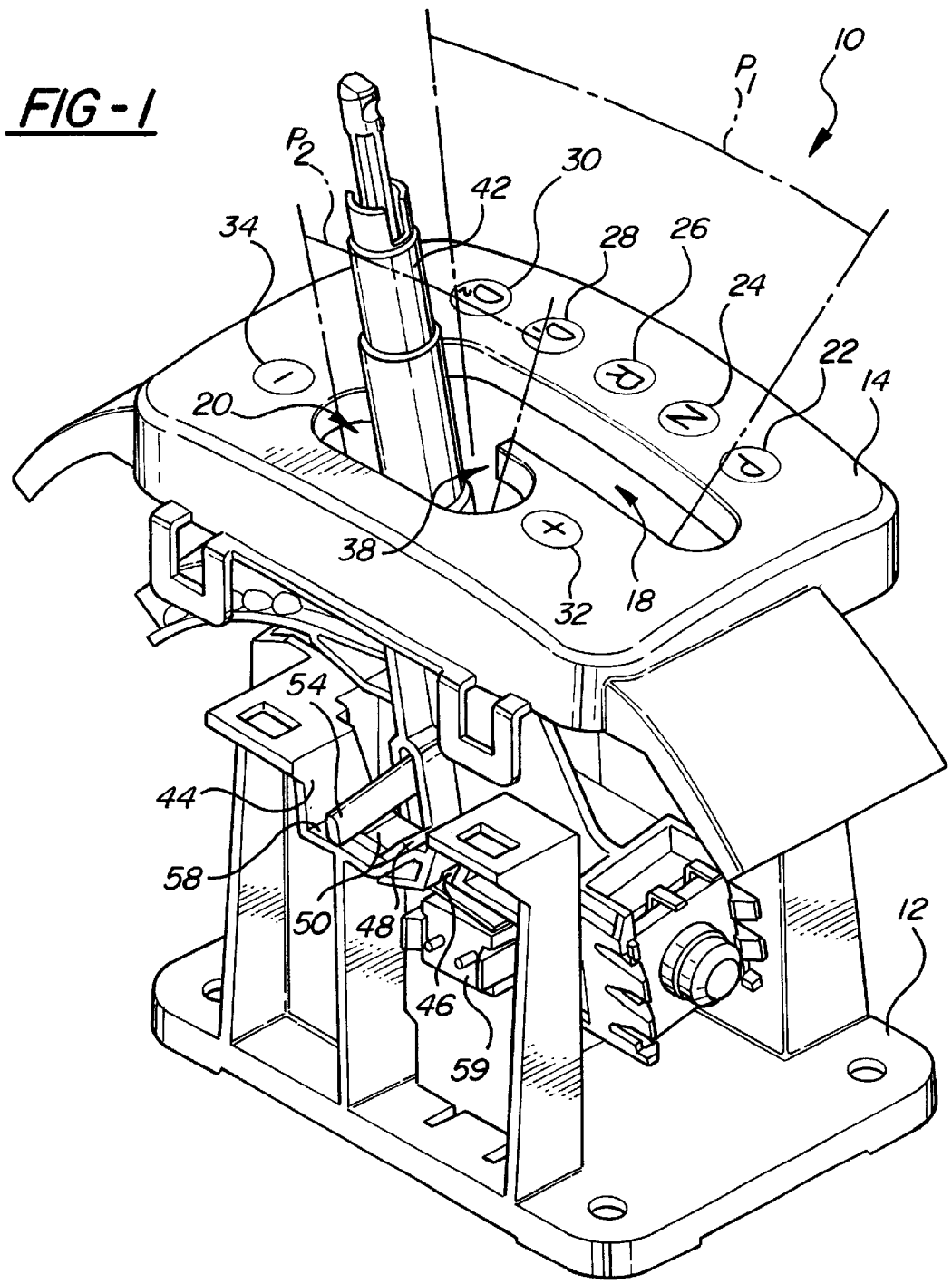
FIG. 1 is a perspective view of a shifter assembly of the present invention.

Referring to the Figures, wherein like numerals indicate like or corresponding parts throughout the several views, a shifter assembly for automatic transmissions is generally shown at 10 in FIG. 1. The shifter assembly 10 has a base 12 for securing the shifter assembly 10 to a vehicle floor and for supporting shifter assembly components. A detent member 14, or bezel, is supported by the base 12. The detent member 14 defines an automatic shift path, generally indicated at 18, and a manual shift path, generally indicated at 20, which have a plurality of gear positions 22, 24, 26, 28, 30, 32, 34 within the shift paths 18, 20. The automatic 18 and manual 20 shift paths respectively define a first, P1, and second, P2, plane and are connected by a transition path 38.

Figure 2:
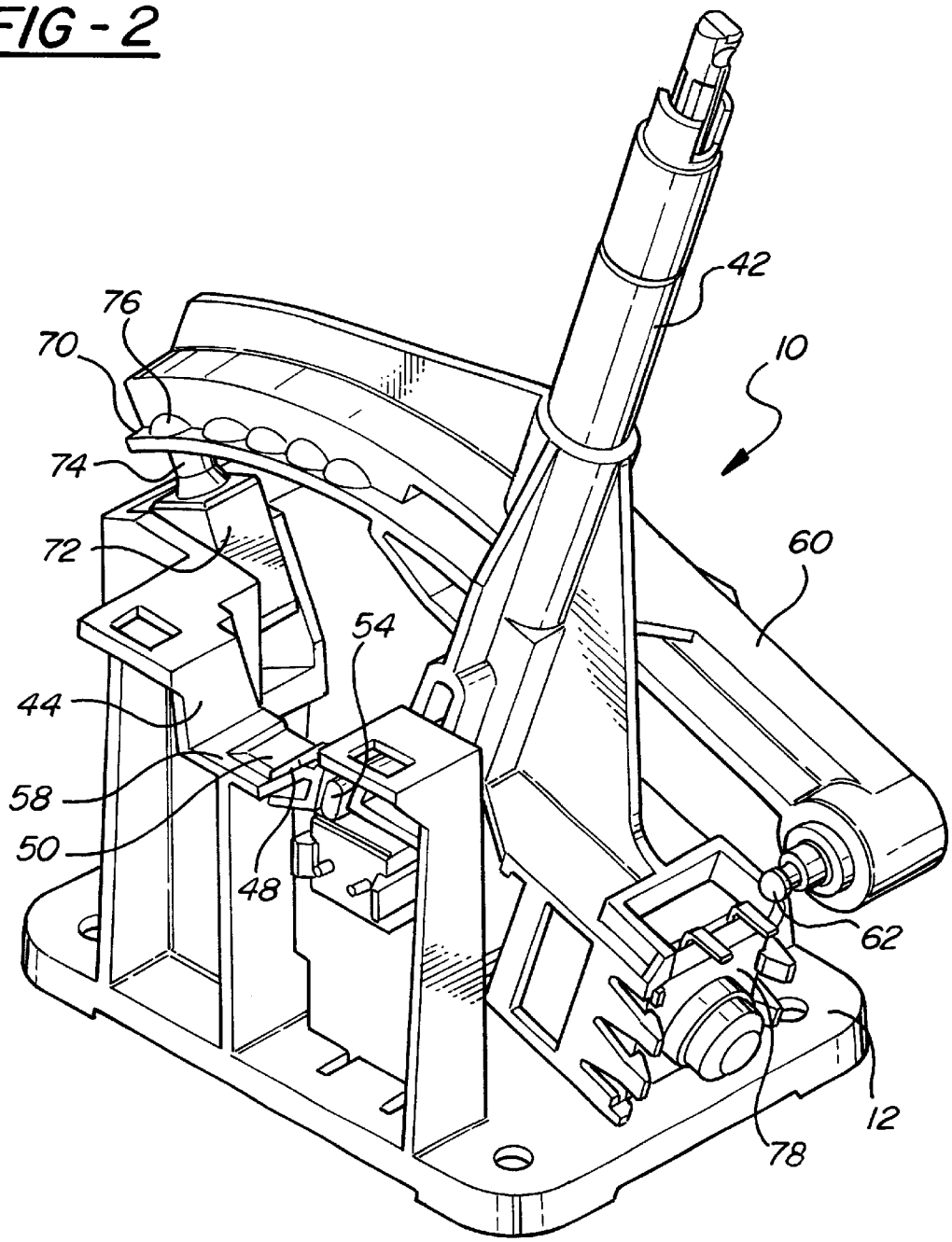
FIG. 2 is a perspective view of the shifter assembly in FIG. 1 with the detent member removed for clarity.

Referring to FIGS. 1 and 2, the shifter assembly 10 has a pivotally supported shift lever 42 that is movable in the paths 18, 20, 38 through the gear positions 22, 24, 26, 28, 30, 32, 34. The base 12 has a gate 44 with a plurality of stepped regions 46, 48, 50 that define the gear positions 22, 24, 26, 28, 30 in the automatic shift path 18. Specifically, the stepped regions include the park region 46, the reverse region 48, the neutral/third gear region 50, and the gear region 52 for manual shifting. The shift lever 42 has a pawl 54 disposed within the gate 44 for coacting with the stepped regions 46, 48, 50 and preventing unintentional gear shifts. The gate 44 has a ramp 58 adjacent to the stepped regions 46, 48, 50, 52 for coacting with the pawl 54 when the shift lever 42 is in the manual shift path 20. When the shift lever 42 is moved to the manual shift path 20, as shown in FIG. 1, the pawl 54 is forced upward and out of engagement with the stepped regions 46, 48, 50 and into sliding engagement with the ramp "50". The shift lever 42 may then be moved along second plane P2 with the pawl 54 slidably supported on the ramp 58.

The base 12 supports an ignition switch/parklock switch 59 which coact with the pawl 54 when it is in the park region 46 to prevent the ignition key from being removed unless the shift lever 42 is in the park gear position 22.

With continuing reference to FIG. 2, a transmission control arm 60 is pivotally connected to the base 12 by a pivot pin (not shown) for movement about an axis A, shown in FIG. 3. The control arm 60 has a cable stud 62 adapted for connection to a linkage for operating an automatic transmission. The shift lever 42 is connected to the control arm 60 by a joint, which is the subject of the present invention. An interlock mechanism 64 couples the shift lever 42 and control arm 60 together when the shift lever 42 is in automatic shift path 18 such that said shift lever 42 and control arm 60 pivot together about the axis A. The interlock mechanism 64 has a U-shaped pocket 66 that receives a protrusion 68 on the shift lever 42.

The shift lever 42 has a slider 70 and a biasing member 72 that orient the shift lever 42 once it is positioned in one of the gear positions 22, 24, 26, 28, 30. The biasing member 72 has a spring biased pin 74 that coacts with semispherical depressions 76. The shift lever 42 supports a transmission interlock solenoid 78 which coacts with the pawl 54 to prevent the pawl 54 from being moved out of the park region 46 unless the brake pedal is depressed.

The shifter assembly 10 includes a pivotal connection, generally shown at 80, interconnecting the control arm 60 and the shift lever 42 for supporting the shift lever 42 on the control arm 60 and pivoting the shift lever 42 relative to the control arm 60 for changing between shift paths 18, 20. Said another way, the pivotal connection 80 permits the protrusion 68 to be disengaged from the pocket 66 so that the shift lever 42 may be moved from the automatic shift path 18, through the transition path 38, and into the manual shift path 20. Said yet another way, the pivotal connection 80 permits the shift lever 42 to be moved the gear positions 22, 24, 26, 28, 30, 32, 34 and the paths 18, 20, 38.

The pivotal connection 80 comprises a universal connection for pivoting the shift lever 42 relative to the control arm 60 in a plurality of transverse planes, such as the first P1 and second P2 planes and the plane defined by the transition path 38. The shift lever 42 is pivotal about the universal connection away from the control arm 60, when the shift lever 42 is in the automatic shift path 18, and into the manual shift path 20. The universal connection includes a ball and socket, wherein one of the control arm 60 and the shift lever 42 includes the ball and the other of the control arm 60 and the shift lever 42 includes the socket. Preferably, the control arm 60 has the ball 84 extending therefrom, and the shift lever 42 has the socket 84, as shown in FIGS. 5 and 6 respectively. The socket 84 has a grooves 86 that enable the ball 84 to be more easily snapped into the socket 82.

Figure 4:
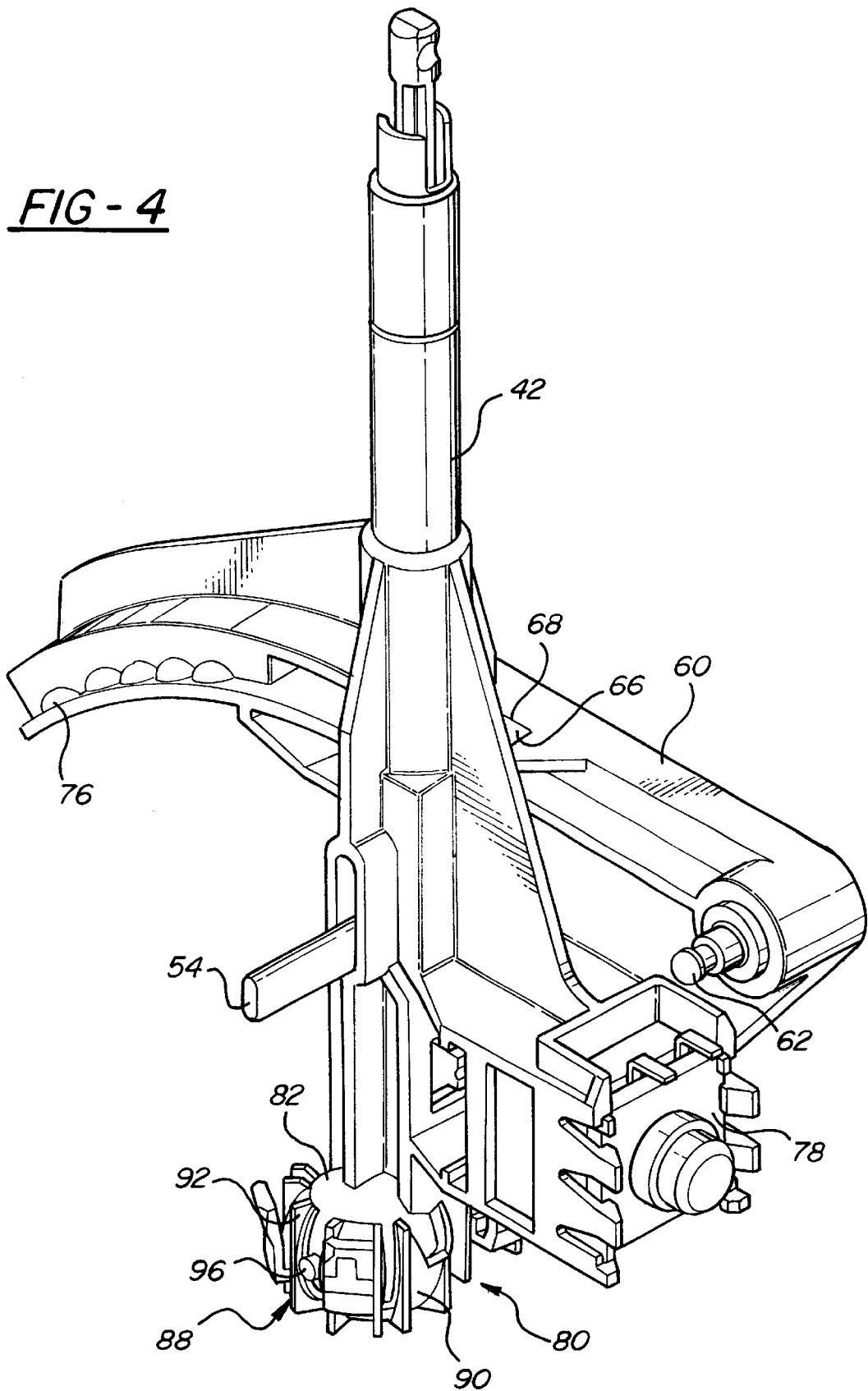
FIG. 4 is a perspective view of the other side of the sub-assembly shown in FIG. 3.

A retainer, generally indicated at 88 in FIG. 4, is secured to the ball 84 and socket 82 to ensure that they do not become separated during operation. The retainer 88 has a cup 90 with a plurality of flexible fingers 92 disposed about a perimeter 94 of the cup 90 for receiving and retaining the ball 84 and socket 84. A pin 96 extending from the socket 82 is received between fingers 92 to prevent the shift lever 42 from twisting in the cup 90. The retainer 88 also has a slotted collar 98 for securely receiving the ball 84 and socket 82 and securing the ball 84 and the socket 82 to one another.

Therefore, the shift lever 42 is pivotally supported directly on or by the control arm 60 which provides a closer cooperation between the shift lever 42 and the control arm 60 than in the prior art assemblies wherein the shift lever is supported independently of the control arm on the base for pivotal movement.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shifter assembly (10) for automatic transmissions comprising:

a base (12);

a detent member (14) supported by said base (12) and defining an automatic (18) and manual (20) shift path and a plurality of gear positions (22, 24, 26, 28, 30, 32, 34) within said shift paths (18, 20);

a transmission control arm (60) pivotally connected to said base (12) for movement about an axis (A) and adapted for connection to a linkage for operating an automatic transmission;

a shift lever (42) movable through said gear positions (22, 24, 26, 28, 30, 32, 34);

a pivotal connection (80) interconnecting said control arm (60) and said shaft lever (42) for supporting said shift lever (42) on said control arm (60) and pivoting said shaft lever (42) relative to said control arm (60) for changing between said shaft paths (18, 20), said pivotal connection (80) comprising a universal connection for pivoting said shift lever (42) relative to said control arm (60) in a plurality of transverse planes, said universal connection comprising a ball (84) and socket (82) with one of said control arm (60) and said shift lever (42) including said ball (84) and the other of said control arm (60) and said shift lever (42) including said socket (82).

2. The assembly (10) as set forth in claim 1 further comprising an interlock mechanism (64) for coupling said shift lever (42) and control arm (60) together in said automatic shift path (18) such that said shift lever (42) and control arm (60) pivot together about said axis A.

3. The assembly (10) as set forth in claim 2 wherein said automatic shift path (18) is in a first plane (P1) and said manual shift path (20) is in a second plane (P2), and said shift lever (42) being pivotal about said universal connection away from said control ann (60) and into said manual shift path (20).

4. The assembly (10) as set forth in claim 3 wherein said base (12) further includes a gate (44) having a plurality of stepped regions (46, 48, 50,) that define said gear positions (22, 24, 26, 28, 30) in said automatic shift path (18), and wherein said shift lever (42) further includes a pawl (54) disposed within said gate (44) for coacting with said stepped regions (46,48, 50), said gate (44) including a ramp (58) adjacent to at least on of said stepped regions (46, 48, 50) for coacting with said pawl (54) in said manual shift path (20).

5. The assembly (10) as set forth in claim 1 wherein said control arm (60) includes said ball (84).

6. The assembly (10) as set forth in claim 1 wherein said universal connection further comprises a retainer (88) having a cup (90) and a slotted collar (98) for securely receiving said ball (84) and said socket (82) and securing said ball (84) and said socket (82) to one another.

7. The assembly (10) as set forth in claim 6 wherein said cup (90) includes a plurality of flexible fingers (92) disposed about a perimeter (94) of said cup (90) for receiving and retaining said ball (84) and socket (82).

8. The assembly (10) as set forth in claim 7 wherein said socket (82) includes a pin (96) extending therefrom and received between said fingers (92) from preventing said shift lever (42) from twisting in said cup (90).

* * * * *